United States Patent Office.

HUGH McDONALD, OF ALLEGHENY, PENNSYLVANIA.

Letters Patent No. 76,223, dated March 31, 1868.

IMPROVEMENT IN TREATING CINDER FOR FIXING-FURNACES.

*The Schedule referred to in these Letters Patent and making part of the same.*

TO ALL WHOM IT MAY CONCERN:

Be it known that I, HUGH McDONALD, of the city and county of Allegheny, in the State of Pennsylvania, have invented a new and useful Improvement in Treating Cinder for Fixing-Furnaces used in the manufacture of iron and steel; and I do hereby declare that the following is a full and exact description thereof.

To enable others skilled in the art of manipulating and working furnaces, used in the manufacture of iron or steel, to use my invention, I will proceed to describe its object, nature, and application.

The object of my invention is to convert the cinder, slag, dross, or recrement of iron, and of furnaces used in the manufacture of iron or steel, into a suitable material for a "fix" for said furnaces.

The nature of my invention consists in subjecting melted cinder, slag, dross, or recrement of iron, and of furnaces used in the manufacture of iron or steel, to the action of an active current of air, for imparting or giving to said cinder, slag, dross, or recrement the necessary property for a "fixing" for furnaces.

The application of my invention is as follows: The cinder, slag, dross, or recrement of iron, and of furnaces, while in a melted state, is subjected to a strong and active current of air, and so manipulated that all parts of the melted cinder, slag, dross, or recrement are thoroughly acted upon by the air; then, by the use of suitable tools, the cinder, slag, dross, or recrement is placed around, on the sides of the furnace, in the manner usual for "fixing." In preparing the cinder, slag, dross, or recrement for a fixing-material, I use a strong current of air, produced by a fan or cylinder-blower, and subject the melted cinder, slag, dross, or recrement to said current of air, from fifteen to sixty minutes, but the time will, of course, depend on the strength of the blast, the quantity and degree of heat of the cinder, slag, dross, or recrement; hence, much must, of necessity, be left to the judgment and experience of the skilled workman, care being taken to bring all parts of the melted matter in contact with the air, which may be applied by means of hollow tools or pipes, or other suitable means, which I also leave to the skill and good judgment of the mechanic.

Having thus described the object, nature, and application of my invention, what I claim as of my invention, is—

Subjecting melted cinder, slag, dross, or recrement of iron, and of furnaces used in the manufacture of iron and steel, to an active current of air, substantially as herein described, and for the purpose set forth.

HUGH McDONALD.

Witnesses:
   A. C. JOHNSTON,
   JAMES J. JOHNSTON.